US012696937B2

(12) United States Patent
Ferrie et al.

(10) Patent No.: US 12,696,937 B2
(45) Date of Patent: Aug. 4, 2026

(54) SUBSTITUTE SMOKING DEVICE HAVING SEPARATE DISPLAY ELEMENTS AND SYSTEM USING THE SAME

(71) Applicant: IMPERIAL TOBACCO LIMITED, Bristol (GB)

(72) Inventors: Kate Ferrie, Bristol (GB); Edward Ross Shenton, Bristol (GB); Jonathan Stephen Marchbank, Bristol (GB); Peter Lomas, Bristol (GB); Tom Sudlow, Bristol (GB)

(73) Assignee: IMPERIAL TOBACCO LIMITED, Bristol (GB)

( * ) Notice: Subject to any disclaimer, the term of this patent is extended or adjusted under 35 U.S.C. 154(b) by 0 days.

(21) Appl. No.: 19/336,293

(22) Filed: Sep. 22, 2025

(65) Prior Publication Data

US 2026/0013571 A1 Jan. 15, 2026

Related U.S. Application Data

(63) Continuation of application No. 17/211,135, filed on Mar. 24, 2021, which is a continuation of application (Continued)

(30) Foreign Application Priority Data

Sep. 24, 2018 (GB) ..................................... 1815515
Sep. 24, 2018 (GB) ..................................... 1815522

(Continued)

(51) Int. Cl.

*A24F 40/60* (2020.01)
*A24F 40/20* (2020.01)

(Continued)

(52) U.S. Cl.

CPC .............. *A24F 40/60* (2020.01); *A24F 40/20* (2020.01); *A24F 40/40* (2020.01); *A24F 40/46* (2020.01);

(Continued)

(58) Field of Classification Search

CPC .......... A24F 40/60; A24F 40/20; A24F 40/40; A24F 40/46; A24F 40/50; A24F 40/57;

(Continued)

(56) References Cited

U.S. PATENT DOCUMENTS

| | | | |
|---|---|---|---|
| 2012/0048266 | A1 | 3/2012 | Alelov |
| 2014/0278258 | A1 | 9/2014 | Shafer |

(Continued)

FOREIGN PATENT DOCUMENTS

| | | | |
|---|---|---|---|
| CN | 107616552 | A | 1/2018 |
| KR | 20160058565 | A | 5/2016 |

OTHER PUBLICATIONS

EPO, Extended European Search Report, Application No. 123165405. 4. Mail Date Jul. 19, 2023. 6 pages.

(Continued)

*Primary Examiner* — Justin M Kratt
(74) *Attorney, Agent, or Firm* — Perkins Coie LLP; Kenneth H. Ohriner

(57) ABSTRACT

The present disclosure relates to the field of smoking tobacco. In particular, the present disclosure relates to smoking substitute systems and particularly, although not exclusively, to a heat-not-burn (HNB) smoking substitute system. Further in particular, the present disclosure relates to a smoking substitute system having at least two different modes of operation. The present disclosure also relates to an improved housing design. The present disclosure further relates to a smoking substitute device with an improved housing design. The present disclosure yet further relates to (Continued)

smoking substitute systems having at least two independent display elements.

15 Claims, 8 Drawing Sheets

Related U.S. Application Data

No. PCT/EP2019/075480, filed on Sep. 23, 2019, and a continuation of application No. PCT/EP2019/075497, filed on Sep. 23, 2019, and a continuation of application No. PCT/EP2019/075533, filed on Sep. 23, 2019, and a continuation of application No. PCT/EP2019/075503, filed on Sep. 23, 2019.

(30) Foreign Application Priority Data

Sep. 24, 2018 (GB) ...................................... 1815524
Sep. 24, 2018 (GB) ...................................... 1815525

(51) Int. Cl.

| | |
|---|---|
| ***A24F 40/40*** | (2020.01) |
| ***A24F 40/46*** | (2020.01) |
| ***A24F 40/50*** | (2020.01) |
| ***A24F 40/57*** | (2020.01) |
| ***A24F 40/90*** | (2020.01) |
| ***H05B 3/06*** | (2006.01) |
| ***H05B 3/42*** | (2006.01) |
| *A24F 40/65* | (2020.01) |

(52) U.S. Cl.
CPC .............. *A24F 40/50* (2020.01); *A24F 40/57* (2020.01); *A24F 40/90* (2020.01); *H05B 3/06* (2013.01); *H05B 3/42* (2013.01); *A24F 40/65* (2020.01); *H05B 2203/021* (2013.01)

(58) Field of Classification Search
CPC ........... A24F 40/90; A24F 40/65; H05B 3/06; H05B 3/42; H05B 2203/021
See application file for complete search history.

(56) References Cited

U.S. PATENT DOCUMENTS

| | | | | |
|---|---|---|---|---|
| 2015/0272220 | A1 | 10/2015 | Spinka | |
| 2017/0360103 | A1 | 12/2017 | Li et al. | |
| 2018/0177231 | A1 | 6/2018 | Woodbine | |
| 2019/0029319 | A1* | 1/2019 | Moorman | ................. A24F 9/02 |

OTHER PUBLICATIONS

EPO, "Examination Report", for Application No. EP19773809.9. Mail Date: Apr. 15, 2024.
EPO, "Examination Report", for Application No. EP23165405.4. Mail Date: Dec. 12, 2025.
EPO, "Extended European Search Report", for Application No. EP23165405.4. Mail Date: Jul. 19, 2023.
EPO, "Extended European Search Report", for Application No. EP24174746.8. Mail Date: Aug. 26, 2024.
EPO, "Examination Report", Application No. 24174746.8. Mail Date: Apr. 9, 2026. 6 pages.

* cited by examiner

SUBSTITUTE SMOKING DEVICE HAVING SEPARATE DISPLAY ELEMENTS AND SYSTEM USING THE SAME

CROSS REFERENCE TO RELATED APPLICATIONS/INCORPORATION BY REFERENCE STATEMENT

The present patent application is a continuation of U.S. patent application Ser. No. 17/211,135, filed Mar. 24, 2021, which is a continuation of International Application No. PCT/EP2019/075503, filed Sep. 23, 2019; which claims priority to the patent application identified by GB Serial No. 1815522.6, filed on Sep. 24, 2018. Application Ser. No. 17/211,135 is also a continuation of International Application No. PCT/EP2019/075497, filed Sep. 23, 2019; which claims priority to the patent application identified by GB Serial No. 1815515.0, filed on Sep. 24, 2018. Application Ser. No. 17/211,135 is also a continuation of International Application No. PCT/EP2019/075480, filed Sep. 23, 2019; which claims priority to the patent application identified by GB Serial No. 1815525.9, filed on Sep. 24, 2018. Application Ser. No. 17/211,135 is also a continuation of International Application No. PCT/EP2019/075533, filed Sep. 23, 2019; which claims priority to the patent application identified by GB Serial No. 1815524.2, filed on Sep. 24, 2018. The entire contents of each of the above-referenced patent (s)/patent application(s) are hereby expressly incorporated by reference herein.

TECHNICAL FIELD

The present disclosure relates to the field of smoking tobacco. In particular, the present disclosure relates to smoking substitute systems and particularly, although not exclusively, to a heat-not-burn (HNB) smoking substitute system. Further in particular, the present disclosure relates to a smoking substitute system having at least two different modes of operation. The present disclosure also relates to an improved housing design. The present disclosure further relates to a smoking substitute device with an improved housing design. The present disclosure yet further relates to smoking substitute systems having at least two independent display elements.

BACKGROUND

The smoking of tobacco is generally considered to expose a smoker to potentially harmful substances. It is generally thought that significant amounts of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute systems (or "substitute smoking systems") in order to avoid the smoking of tobacco.

Such smoking substitute systems can form part of nicotine replacement therapies aimed at people who wish to stop smoking and overcome a dependence on nicotine.

Smoking substitute systems include electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute systems are intended to provide a substitute for the rituals of smoking, whilst providing the user with a similar experience and satisfaction to those experienced with traditional smoking and with combustible tobacco products. Some smoking substitute systems use smoking substitute articles that are designed to resemble a traditional cigarette and are cylindrical in form with a mouthpiece at one end.

The popularity and use of smoking substitute systems has grown rapidly in the past few years. Although originally marketed as an aid to assist habitual smokers wishing to quit tobacco smoking, consumers are increasingly viewing smoking substitute systems as desirable lifestyle accessories.

There are a number of different categories of smoking substitute systems, each utilising a different smoking substitute approach.

One approach for a smoking substitute system is the so-called "heat not burn" ("HNB") approach in which tobacco (rather than an "e-liquid") is heated or warmed to release vapour. The tobacco may be leaf tobacco or reconstituted tobacco. The vapour may contain nicotine and/or flavourings. In the HNB approach the intention is that the tobacco is heated but not burned, i.e. the tobacco does not undergo combustion.

A typical HNB smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes moisture in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from an inlet to a mouthpiece (outlet), the vapour cools and condenses to form an aerosol for inhalation by the user. The aerosol will normally contain the volatile compounds.

In HNB smoking substitute systems, heating as opposed to burning the tobacco material is believed to cause fewer, or smaller quantities, of the more harmful compounds ordinarily produced during smoking. Consequently, the HNB approach may reduce the odour and/or health risks that can arise through the burning, combustion and pyrolytic degradation of tobacco.

There may be a need for improved design of smoking substitute systems, in particular HNB smoking substitute systems, to enhance the user experience and improve the function of the HNB smoking substitute system.

BRIEF DESCRIPTION OF THE DRAWINGS

So that the present disclosure may be understood, and so that further aspects and features thereof may be appreciated, embodiments illustrating the principles of the disclosure will now be discussed in further detail with reference to the accompanying figures, in which.

Figure 1A:
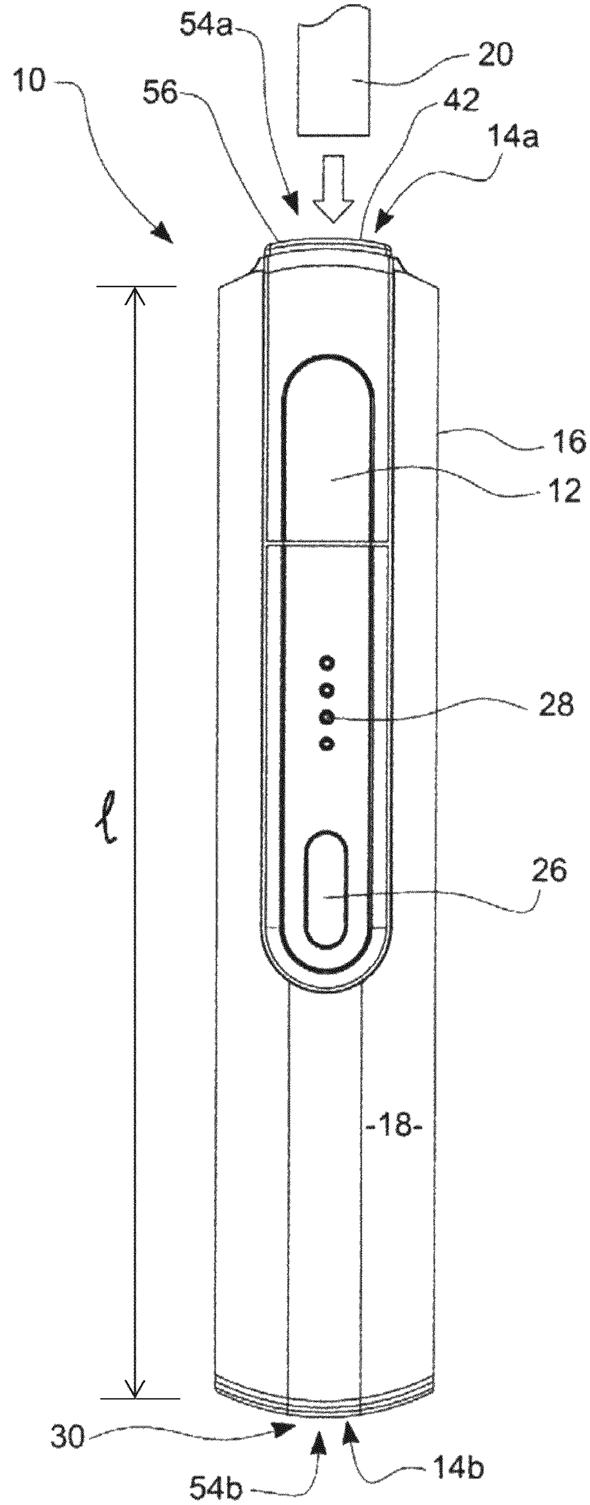
FIGS. 1A and 1B show different views of an exemplary embodiment of a smoking substitute device in accordance with the present disclosure.

The present disclosure has been devised in the light of the above considerations.

DETAILED DESCRIPTION OF THE VARIOUS NON-LIMITING EMBODIMENTS

At least one such need may be met with the subject-matter of the independent claims. Particular (but non-limiting) embodiments may be taken from the dependent claims and are explained in more detail in the following description in relation to the provided drawings.

At its most general, the present disclosure relates to an aerosol-forming delivery system, e.g. a smoking substitute system such as an HNB system. More specifically, the present disclosure relates to a smoking substitute device having multiple, different modes of operation, an improved housing design, a smoking substitute device with an improved housing design, and smoking substitute systems having at least two independent display elements.

According to a first aspect of the present disclosure, there is provided a smoking substitute device comprising a heating element, wherein the smoking substitute device is adapted for receiving a smoking substitute consumable, wherein the heating element is adapted for heating the smoking substitute consumable, wherein the smoking substitute device comprises at least two modes of operation and wherein the smoking substitute device is a heat-not-burn smoking substitute device.

According to a second aspect of the present disclosure, there is provided a smoking substitute system comprising a smoking substitute device and a smoking substitute consumable.

According to a third aspect of the present disclosure, there is provided a method for using a smoking substitute system, the method comprising inserting a smoking substitute consumable into a smoking substitute device and heating the smoking substitute consumable using a heating element.

According to a fourth aspect of the present disclosure, there is a provided a smoking substitute device comprising a main body and a bung element, wherein the main body has an elongated shape comprising a first end and a second end, wherein the first end comprises a first cavity, wherein the second end comprises a second cavity and wherein the bung element is adapted to be insertable alternatively into the first cavity and the second cavity.

According to a fifth aspect of the present disclosure, there is provided a smoking substitute system comprising a smoking substitute device and a smoking substitute consumable.

According to a sixth aspect of the present disclosure, there is provided a method for using a smoking substitute system, a method comprising inserting a smoking substitute consumable into a smoking substitute device and heating the smoking substitute consumable using a heating element.

According to a seventh aspect of the first disclosure, there is provided a smoking substitute device comprising a main body having a length and a transverse cross-section, wherein the cross-section comprises at least two partially parallel, substantially linear sides of different width, wherein the cross-section further comprises two sides having a curved shape and wherein the curved sides connect with the linear sides for forming the cross-section.

According to an eighth aspect of the present disclosure, there is provided a smoking substitute system comprising a smoking substitute device and a smoking substitute consumable.

According to a ninth aspect of the present disclosure, there is provided a method for using a smoking substitute system, the method comprising inserting a smoking substitute consumable into a smoking substitute device and heating the smoking substitute consumable using a heating element.

According to a tenth aspect of the present disclosure there is a provided a smoking substitute device comprising a main body, wherein the main body comprises a first display element for displaying first information and a second display element for displaying second information, wherein the first display element is arranged separate from and independent of the second display element, wherein the first information is different from the second information, wherein one of the first and second information is for displaying a power status of the smoking substitute device and wherein the smoking substitute device is a heat-not-burn device.

According to an eleventh second aspect of the present disclosure, there is provided a smoking substitute system comprising a smoking substitute device and a smoking substitute consumable.

According to a twelfth aspect of the present disclosure, there is provided a method for using a smoking substitute system, wherein the method comprising inserting a smoking substitute consumable in to a smoking substitute device and heating the smoking substitute consumable using a heating element.

Ideas and concepts of this disclosure may be considered to be based on the following observations and findings.

As mentioned before, the present disclosure is concerned with smoking substitute systems. A smoking substitute system may comprise a smoking substitute device or an aerosol-forming device, which may be a heat-not-burn (HNB) smoking substitute device. An HNB device is a device that is adapted for heating but not combusting the aerosol-forming substrate. This substrate may be made of tobacco material and may comprise additives assisting in the forming of the aerosol by the smoking substitute device. The smoking substitute device may comprise a main body for housing a heating element. The heating element may comprise an elongated, e.g. rod-shaped, tube-shaped or blade-shaped heating element. The heating element may project into or surround a first cavity within the main body of the smoking substitute device, which first cavity is for receiving a smoking substitute consumable.

The smoking substitute device may comprise an electrical power supply, e.g. a (rechargeable) battery for powering the heating element. It may further comprise a control unit to control the supply of power to the heating element.

In some embodiments, when a consumable is inserted into the first cavity within the main body, a portion of the smoking substitute consumable is to be penetrated by the heating element upon insertion of the smoking substitute consumable. In particular, the heating element may penetrate the smoking substitute consumable in an area of the consumable where the aerosol-forming substrate, e.g. tobacco material, is arranged.

The heating element is thus arranged inside of the smoking substitute consumable and in particular inside of the tobacco material. When energy is provided to the heating element, the heating element is heated to a target temperature, such as (but not limited to) in the range above the vaporization temperature of nicotine contained in the tobacco material, but below the temperature where the tobacco material would start to burn or combust. E.g., the heating element may be heated to a temperature of above 170° C., the vaporization temperature of nicotine, but below 400° C. to avoid burning of the tobacco material in the consumable. In certain particular (but non-limiting) embodiments, the target temperature may not exceed approximately 350° C.

In accordance with the present disclosure, the smoking substitute device is provided with at least two modes of operation, which may be, e.g., different temperatures of the heating element resulting in a different extraction behaviour of vapour in general or in particular nicotine from the tobacco material in the consumable. E.g., a first setting, e.g. a. high setting, and a second setting, e.g. a low setting, may be conceivable.

The use of different modes of operation and thus different modes of extraction or different modes of vapour generation and delivery may allow to tailor nicotine delivery to a specific situation in which the smoking substitute device is to be used. In other words, using a defined and/or variable temperature may allow the control of the nicotine delivery from the consumable. Such may be referred to as a stealth mode, a cruise mode or boost mode, respectively. E.g. in a stealth mode, a temperature of the heating element may be lower than the temperature of the heating element in either a cruise mode or boost mode. In boost mode, the temperature of the heating element may be higher than either in stealth mode or cruise mode.

Two or more different modes of operation are conceivable. In the context of this disclosure, it has been discovered that the temperature of the heating element also affects the production of visible vapour from the consumable and thus influences visible vapour delivery. Further, the amount of vapour generated by the smoking substitute device in turn affects the experience of a user when using the smoking substitute device. E.g., an increased level of vapour results in an increase in mixing of vapour with nicotine released from the consumable and the tobacco material, respectively, prior to mouth delivery and thus results in a smoother substitute smoking experience. It has been found out, that nicotine levels are generally not greatly affected by different temperatures of the heating element as long as the heating temperature is higher than 170° C., the vaporization temperature of nicotine.

Also, by varying the temperature of the heating element, the intensity of flavour may be affected. E.g. with higher temperature, more flavour components are released from the aerosol-forming substrate.

A control element like an actuator or activation switch to start the operation of the smoking substitute device may be provided. The mode of operation may further directly influence a possible battery life and may thus allow the user to tailor the overall handling of the smoking substitute device to one's preference. A single control element may be sufficient to choose a certain mode of operation. As a result of different temperatures of the heating element, a certain smoking substitute consumable may last longer in normal mode or stealth mode and shorter in boost mode or normal mode.

As mentioned before, the temperature of the heating element may influence the amount of generated visible vapour. Accordingly, the mode of operation may be set upon a certain use situation or use scenario. E.g., using the smoking substitute device outside or inside a closed space, like a car or a room, may require different modes of operation to minimize the impact of the smoking substitute system on non-users.

Optional features will now be set out. These are applicable singly or in any combination with any aspect of the present disclosure.

According to an embodiment of the present disclosure, the smoking substitute device may further comprise a main body and a cavity, wherein the cavity may be arranged in the main body, wherein the heating element may be arranged in the cavity, wherein the cavity may be adapted to receive the smoking substitute consumable and wherein the heating element may be adapted for penetrating the smoking substitute consumable to get into contact with tobacco material located inside the smoking substitute consumable upon insertion of the smoking substitute consumable into the smoking substitute device for heating of the tobacco material.

The heating element of the smoking substitute device may thus be arranged within the smoking substitute device, in particular within its main body, thus protecting a user from injury by heat or a sharp or pointy edge of the heating element. At the same time, the heating element may easily penetrate the smoking substitute consumable, e.g. to open up the smoking substitute consumable, to get access to the tobacco material located inside. A smoking substitute consumable may thus be easily operable without the risk of a user coming in direct contact with the tobacco material.

According to a further embodiment of the present disclosure, the smoking substitute device may further comprise a control element operable by a user of the smoking substitute device, wherein the control element is adapted for setting a desired mode of operation.

According to a further embodiment of the present disclosure, there is provided a smoking substitute device wherein for setting a desired mode of operation, the control element is actuated by the user of the smoking substitute device and wherein different modes of operation are settable depending on a duration of the actuation of the control element by the user.

By using a control element like an actuator or an activation switch, a user may easily set a desired mode of operation, e.g. by pressing the control element for a certain duration to activate a certain mode of operation.

According to a further embodiment of the present disclosure, the desired mode of operation may be settable for the duration of consuming a smoking substitute consumable.

In other words, a user determines or chooses a desired mode of operation at the beginning of consuming a smoking substitute consumable. E.g., the user may decide to operate the smoking substitute device in normal mode and may thus press the control element for a duration associated with the normal mode. This may result in a defined, e.g. timed heating of the heating element to the temperature linked with the mode of operation and for a certain duration without requiring the user to activate the control element again. Possibly, another press of the control element may terminate the current mode of operation, e.g. when the user decides that a consumable is depleted. Alternatively, the operation may cease after a defined duration, which duration may depend on the set mode of operation.

According to a further embodiment of the present disclosure, a mode of operation may relate to a heating temperature of the tobacco material during the consumption of the smoking substitute consumable.

In other words, the heating element may produce a certain target heating temperature to the tobacco material. Setting a desired temperature may affect generation and delivery of visible vapour to a user.

According to a further embodiment of the present disclosure, the temperature may be in a range between substantially 170° C. and 400° C., in particular, wherein in a first mode of operation, the temperature is between substantially 170° C. and 300° C. and in a second mode of operation, the temperature may be between substantially 250° C. and 400°, further in particular, wherein in a first mode of operation, the temperature may be between substantially 225° C. and 275° C. and in a second mode of operation, the temperature may be between substantially 275° C. and 350° C., further in particular, wherein in a first mode of operation, the temperature is substantially 250° C. and in a second mode of operation, the temperature is substantially 350° C.

In particular, the temperature range between approx. 170° C. and 350° C. may be a particular (but non-limiting) temperature range for a heat-not-burn smoking substitute device with 170° C. being the vaporization temperature of nicotine, while avoiding substantially exceeding 350° C. avoids burning of the tobacco material in the smoking substitute consumable. Choosing defined temperatures between 170° C. and 350° C. may allow tailoring the smoking experience to the desires of a particular user and may generally allow the provision of different modes of operation.

According to a further embodiment of the present disclosure, the smoking substitute device may comprise at least three modes of operation relating to the heating temperature of the tobacco material during the consumption of the smoking substitute consumable, wherein in a first mode of operation, the temperature may be between substantially 170° C. and 250° C., in a second mode of operation, the temperature may be between substantially 200° C. and 300° C. and in a third mode of operation, the temperature may be between substantially 250° C. and 400° C., in particular wherein in a first mode of operation, the temperature may be between substantially 170° C. and 225° C., in a second mode of operation, the temperature may be between substantially 225° C. and 275° C. and in a third mode of operation, the temperature may be between substantially 275° C. and 375° C., further in particular, wherein in a first mode of operation, the temperature is substantially 170° C., in a second mode of operation, the temperature is substantially 250° C. and in a third mode of operation, the temperature is substantially 350° C.

The provision of three distinct temperatures or three modes of operation may allow the provision of e.g. a stealth mode, a cruise or normal mode, and a boost mode.

According to a further embodiment of the present disclosure, a mode of operation may relate to an amount of vapour generated during the consumption of the smoking substitute consumable, in particular in a first mode of operation, less vapour may be generated than in a second mode of operation.

Likewise, the different modes may exhibit different amounts of visible vapour delivered to a user. In particular, less vapour may be generated in a mode of operation having a lower temperature than in a second mode of operation having a higher temperature of the heating element.

According to a further embodiment of the present disclosure, a mode of operation may be dependent on a type of the smoking substitute consumable.

Different types of consumables may require different modes of operation or different temperature settings of the heating element. This may in particular be dependent upon the aerosol/releasing material in the smoking substitute consumable, e.g. in case of flavoured, non-nicotine-containing material, a different temperature may be required than with tobacco material containing nicotine.

According to a further embodiment of the present disclosure, the smoking substitute device may comprise a display element for indicating a mode of operation to the user.

The display element may e.g. be a light source displaying a certain mode of operation by varying colours. E.g. a first mode of operation may be symbolized by an orange colour whereas a second, higher mode of operation may be symbolized by a red colour. Other colour combinations are conceivable.

In accordance with certain embodiments of the present disclosure, the smoking substitute device may comprise two cavities, a first cavity adapted to receive the smoking substitute consumable and a second cavity. The second cavity may in particular be the cavity that is formed by the inclusion of an electrical interface into the main body or housing of the smoking substitute device. In other words, the second cavity may in particular be formed by the electrical interface itself. The electrical interface may be a charging connector to supply electrical energy to the smoking substitute device, in particular for charging a power source or battery located within the main body of the smoking substitute device.

The first cavity and the second cavity may have similar or identical dimensions, at least in one defined dimension of the first and second cavity. The bung element is embodied to be insertable into both the first cavity and the second cavity. While the bung element can be inserted into both cavities, the main intention is to insert the bung element either into the first cavity or into the second cavity. E.g. when not in use, the bung element may be inserted into the first cavity and may remain there without any external force by form fit or force fit of the bung element and at least a part of the first cavity. E.g. the bung element may comprise a protrusion, which conforms to the first cavity to stay only due to frictional forces.

Likewise, when the smoking substitute device is in use, the bung element may be removed and may be inserted into the second cavity so not to get lost. Here, the protrusion of the bung element may conform with the second cavity with a form fit or force fit as well, again e.g. by friction within the cavity, so to have a defined place while the smoking substitute device is being used.

The protrusion may be sized in particular so that it substantially conforms to an opening in an electrical interface. In certain particular (but non-limiting) embodiments, such an interface is a symmetrical electrical interface or symmetrical charging connector like e.g. a USB-C or lightening connector, and the protrusion may substantially conform to the opening of the respective electrical interface. Likewise, it is conceivable to use a non-symmetrical interface like mini USB or micro USB.

In other words, in a non-use mode, the bung element may be inserted into the first cavity to prevent dirt and debris entering the first cavity. Contrary hereto, the bung is inserted into the second cavity during operation, so as to avoid losing the bung element.

Optional features will be set out now. These are applicable singularly or in any combination with any aspect of the present disclosure.

According to an embodiment of the present disclosure, the bung element may be adapted to remain in either one of the first cavity and the second cavity substantially without external force.

In other words, the bung element may conform to the shape of the first cavity and the second cavity to establish a form fit or force fit and may thus remain in the respective cavity, e.g. by friction of the protrusion within the first cavity or the second cavity, without the need to secure the bung element externally.

According to a further embodiment of the present disclosure, the bung element and the first and second cavity are complimentarily shaped.

Here, the bung element, or a protrusion on the bung element, and the first and the second cavity may be complimentarily shaped. Further, it is conceivable that only a part of the first and/or second cavity conforms to the shape of the bung element and the protrusion, respectively. E.g. a part of a cavity may correspond to a width of the protrusion while the other cavity corresponds substantially to the protrusion as a whole.

According to a further embodiment of the present disclosure, in a first mode of operation, the bung element may be inserted into the first cavity and in a second mode of operation, the bung element may be inserted into the second cavity. E.g. in a mode of operation where the smoking substitute device is not in use, the bung element may be inserted into the first cavity while it may be inserted into the second cavity when the smoking substitute device is in use.

According to a further aspect of the present disclosure, a defined mode of operation is activatable only if the bung element is or is not inserted in one of the first cavity and the second cavity. E.g. when the bung element is inserted into the first cavity and thus covering the cavity that would receive a smoking substitute consumable, it may not be possible to activate a mode of operation like switching on the smoking substitute device or activating heating of the heating element. Likewise, the smoking substitute device may not be switched on if the bung element is not inserted into the second cavity, so to make sure that during the operation of the smoking substitute device, the bung element is not lost. Also, it is conceivable that a defined mode of operation is activated by the removal or insertion of the bung element from a certain cavity. E.g. removal of the bung element from the first cavity, the cavity for receiving the smoking substitute consumable, may activate the smoking substitute device.

Further, in addition to removing the bung element from the first cavity it may be conceivable that the bung element, only upon insertion of the bung element into the second cavity, switches on the smoking substitute device. Here, it may positively be avoided to lose the bung element, because otherwise operation of the smoking substitute device would not be possible. Thus, a user of the smoking substitute device will pay extra attention to not lose the bung element. When terminating operation of the smoking substitute device, removal of the bung element from the second cavity may switch off the smoking substitute device or inserting the bung element into the first cavity may switch off the smoking substitute device.

According to a further embodiment of the present disclosure, the smoking substitute device may only be activatable if the bung element is inserted into one of the first and second cavities. E.g. the smoking substitute device can only be switched on if the bung element is inserted into the second cavity and is thus removed from the first cavity.

According to a further embodiment of the present disclosure, the smoking substitute device may not be activatable if the bung element is inserted one of the first and second cavities. E.g. when the bung element is inserted into the first cavity and thus covering the cavity adapted for receiving a smoking substitute consumable, the smoking substitute device may not be switched on to prevent possibly uncontrolled heating of the confined or closed space in the first cavity covered by the bung element.

An uncontrolled or unsupervised heating of the enclosed space in the first cavity closed by the bung element may otherwise result in a dangerous operation of the device, e.g. the bung element may be damaged due to an increase of heat within the first cavity.

According to a further embodiment of the present disclosure, one of the first cavity and the second cavity is a cavity for receiving a smoking substitute consumable and the other one of the first cavity and the second cavity is a cavity comprising electrical interface.

According to a further embodiment of the present disclosure, the electrical interface may be a symmetrical interface, in particular a USB-C interface or a lightening interface.

A symmetrical electrical interface provides the benefit of not having to orient the bung element and its protrusion, respectively, when inserting the bung element into the first or second cavity.

According to a further embodiment of the present disclosure, the main body may comprise an outer shape in the area of the first and second cavity, wherein the shape of the bung element may substantially conform to the shape of the main body in the area of the first and second cavity, so as to be substantially flush with the main body.

In particular, the main body may comprise a similar or identical shape in the area of the first and second cavity. Likewise, the bung element of a side surface of the bung element may be complimentary shaped to the shape of the main body resulting in a possibly pre-formed bung element that conforms with the surface shape of the main body and thus avoids adding a substantial dimension to the outside of the main body when inserted into either the first or second cavity.

According to a further embodiment of the present disclosure, the first cavity may comprise a circular shape with two notches extending at opposite sides of the first cavity defining a first width and wherein the second cavity may comprise substantially the same width in a defined direction.

In other words, the first cavity for receiving a smoking substitute consumable is circular in shape to conform to a smoking substitute consumable. At the same time, two notches extend from the circular area of the first cavity in an outwards direction, at opposite side of the first cavity. The maximum distance between the two notches defines a width, which width substantially corresponds to the width of the second cavity, in particular the width of an electrical interface or charging connector like USB-C or lightening. The protrusion of the bung element may thus be shaped to correspond to the width between the notches in the first cavity as well as to the width of the second cavity and thus to the shape of the electrical interface.

According to a further embodiment of the present disclosure, the bung element may comprise a protrusion having an elongated shape with a first length, wherein the shape of the protrusion conforms to the second cavity and wherein the length conforms to the width of the first cavity. In particular, the length conforms to the width between the notches of the first cavity.

According to a further embodiment of the present disclosure, the insertion of the bung element into one of the first cavity and the second cavity prevents contamination of said cavity. In other words, the bung element closes off the cavity, thereby avoiding entry of dirt or debris into the cavity.

According to a further embodiment of the present disclosure the smoking substitute device may be a heat-not-burn smoking substitute device.

According to a further embodiment of the present disclosure, the electrical interface may be an interface comprising one of an electrical connection, a data connection or both.

In particular, with an electrical interface or charging connector like USB-C or lightening, not only can electrical energy for charging an internal power source be provided to the smoking substitute device, but also a data connection with a device arranged outside of the smoking substitute device may be conceivable. E.g. a control unit or microprocessor incorporated into the smoking substitute device may be accessible by using the data connection of the electrical interface, e.g. for sending and receiving data.

In accordance with certain embodiments of the present disclosure, the smoking substitute device comprises a main body having a length and a transverse cross-section. The cross-section comprises a plurality of sides of different shapes forming the cross-section. In its most basic form, the cross-section comprises two at least partially parallel, substantially linear sides of different width, which are joined by two further sides having a curved shape and connecting the ends of the two substantially linear sides.

Substantially linear in the context of this disclosure may be understood as linear or flat. However, also a slight curvature having a comparably large radius of curvature falls within the meaning of "substantially linear." In other words, substantially linear may be understood as having a radius of curvature which results is an almost linear or flat element, given the particular dimensions of the width of the substantially linear sides. An according radius of curvature may e.g. be in the range of 500 cm to 1000 cm and therefore may be almost unnoticeable to a user of a smoking substitute device.

In the context of the further description, substantially linear will be used in light of this definition, while the examples assume the substantially linear sides to be linear or flat sides.

Even in case of the substantially linear sides having a radius of curvature, the two substantially linear sides may be arranged to be parallel to one another, by comprising the substantially identical radius of curvature. They may be partially parallel in that they may be parallel in an area where the two widths of the substantially linear sides overlap in the cross-section. Since the two substantially linear sides are of a different width, the remaining at least two sides connecting the substantially linear sides are preferably (but not by way of limitation) embodied as sides having a curved shape. In particular, the shape of the two sides is such that they provide a continuous transition from one substantially linear side to the other substantially linear side without bends or edges. This provides a user holding the smoking substitute device with an improved holding experience by providing a smooth and rounded continuous surface.

At the same time, the two substantially linear sides provide a particular means to allow placement of the smoking substitute device on a substantially flat surface like e.g. a table top. Thus, the substantially linear sides provide a surface for placing the smoking substitute device, which effectively prevents rolling or sliding off. Likewise, in case the smoking substitute device is put on one of the two curved sides, it turns substantially without external force until a position is reached where it is again in contact with the substantially linear sides and the object where it is placed upon.

In case the substantially linear sides comprise a radius of curvature, one side of the substantially linear sides may be concave while the other side may be convex thereby providing a particular (but non-limiting) surface for holding the smoking substitute device by conforming to the surface of fingers of a hand. E.g., a thumb may particularly be situated on the concave surface while at least one of the remaining fingers of the same hand is located on the convex surface. The aforementioned rolling resistance is still provided in case the substantially linear sides comprise a radius of curvature in accordance with the present disclosure, in particular if it is a substantially large radius of curvature.

Likewise, flat substantially linear sides or also sides with a radius of curvature, may provide an improved experience to a user in case the smoking substitute device is inserted into a pocket, e.g. a jacket pocket, a shirt breast pocket or a trouser pocket, by conforming of one of the substantially linear sides with the surface of the body underneath the clothing.

Optional features will be set out now. These are applicable singly or in any combination within the aspect of the present disclosure.

According to an embodiment of the present disclosure, the curved sides may be non-circular sides. Non-circular curved sides may provide a particular (but non-limiting) means of providing a transition from one of the substantially linear sides to the other of the substantially linear sides due to the different width of the substantially linear sides. Also, a non-circular shape of the curved sides may provide an improved user experience when holding or handling the device. E.g., in case the smoking substitute device is held not between the thumbs but within the full hand, e.g. one of the substantially linear sides resting against the palm of the closed hand, providing non-linear curved sides provides an even further improved holding experience.

According to a further embodiment of the present disclosure, one of the substantially linear sides may be a front side of the smoking substitute device and the other one of the substantially linear sides may be a back side of the smoking substitute device. Providing the substantially linear sides as front and back sides provides an improved positioning, e.g. of the hand of a user when operating the device. In particular together with the different width of the substantially linear sides, a user of the smoking substitute device may operate the device without actually looking at the device. In other words, the proposed shape allows a user to feel the orientation of the device in one's hand thereby providing an increased user experience and ease of use.

According to a further embodiment of the present disclosure, the front side of the smoking substitute device may comprise at least one of a display element for indicating a mode of operation and a control element for controlling operation of the smoking substitute device.

When a user is operating the smoking substitute device, the shape of the cross-section allows easy determination of a correct positioning or placement of the smoking substitute device, thereby providing an automatic correct alignment of the front side of the smoking substitute device with a regular holding position so that the control element, the display element or both are arranged in the direction pointing to the user for ease of operation.

According to a further embodiment of the present disclosure, the smoking substitute device may further comprise a front face element, wherein at least one of the display element and the control element may be arranged on the front face element and wherein the front face element may in particular protrude from the front side.

In particular a protruding front face element provides haptic feedback to a user for correctly positioning the device during use. Using a dedicated front face element, which may be separate from the main body of the smoking substitute device, allows the use of the identical main body design with different front face elements, thereby providing an improved way of manufacturing a variety of smoking substitute devices.

According to a further embodiment of the present disclosure, the curved sides each may comprise a plurality of curved subsections, wherein each curved side may comprise two curved subsections or wherein each curved side may comprise two curved subsections and a substantially linear subsection arranged between the curved subsections. Such an arrangement provides a main body of the smoking substitute device built from a plurality of separate side elements, allowing easy manufacturing of the smoking substitute device and facilitates repair in case of damage or defect.

According to a further embodiment of the present disclosure, the smoking substitute device may comprise a first end section and a second end section, where the end sections may be non-linear in shape, in particular may comprise a curvature. In other words, the end sections may be non-flat or non-linear to the extent that the smoking substitute device may not be positioned upright on either end section. This effectively prevents the positioning of the smoking substitute device in a position with reduced stability, thereby preventing tumbling of the smoking substitute device, which could result in damage to the smoking substitute device.

According to a further embodiment of the present disclosure, the length of the smoking substitute device may be in the range of 5 cm to 20 cm, in particular in the range of 7 cm to 15 cm, further in particular in the range of 10 cm to 16 cm, further in particular in a range of 12 cm to 13 cm, further in particular substantially 12.7 cm.

According to a further embodiment of the present disclosure, the first width may be in the range of 1 to 3 cm, in particular in the range of 1.2 cm to 2.5 cm, further in particular in the range of 1.3 cm to 2 cm, further in particular in the range of 1.4 cm to 1.6 cm, further in particular substantially 1.5 cm.

According to a further embodiment of the present disclosure, the second width may be in the range of 0.5 cm to 1.5 cm, in particular in the range of 1.6 cm to 1.2 cm, further in particular in the range of 0.65 cm to 1 cm, further in particular in the range of 0.7 cm to 0.85 cm, further in particular substantially 0.73 cm.

According to a further embodiment of the present disclosure, the width of the smoking substitute device may be in the range of 1 cm to 5 cm, in particular in the range of 1.5 cm to 4 cm, further in particular in the range of 2 cm to 3 cm, further in particular in the range of 2.2 cm to 2.6 cm, further in particular substantially 2.4 cm.

According to a further embodiment of the present disclosure a depth of the smoking substitute device may be in the range of 0.5 cm to 3 cm, in particular in the range of 0.8 cm to 2.5 cm, further in particular in the range of 1 cm to 2.2 cm, further in particular in the range of 1.3 cm to 2 cm, further in particular substantially 1.6 cm.

According dimensions of the smoking substitute device provide a device, which is easy to hold and operate and additionally is of such a size that may conveniently be carried in clothing, e.g. pocketed appropriately, without unduly burdening a user or carrier and in particular without visual impact on the appearance of a carrier when pocketed.

According to a further embodiment of the present disclosure, the two substantially linear sides may comprise a radius of curvature in the range of 10 cm to 1000 cm, in particular in the range of 100 cm and 1000 cm, further in particular in the range of 500 cm and 1000 cm. An according radius of curvature provides only a minor curvature in the substantially linear sides, in particular without impacting the actual visual appearance of a curved side. Further, a holding experience may be improved by providing a slight curvature, thus a comparably large radius of curvature, in the two substantially linear sides.

According to a further embodiment of the present disclosure, one of the two substantially linear sides may be concavely shaped and the other one of the two substantially linear sides may be convexly shaped, in particular wherein the two substantially linear sides may comprise a curvature with a substantially identical circle centre. Substantially linear sides which are accordingly shaped may provide an improved holding experience to a user and may further improve pocketing of the smoking substitute device due to an improved resting against a body surface within the pocket.

In accordance with certain embodiments of the present disclosure, In accordance with the present disclosure, the smoking substitute device is provided with at least two display elements for displaying information. The display elements are arranged separate from and are independent of one another. In other words, the location of a first display element and a second display element is visually distinguishable in that the two display elements are not conceived as part of one display element. Further, they are independent from one another to the extent that they display different information or different kinds or types of information. In certain particular (but non-limiting) embodiments, one display element is displaying a power status of the smoking substitute device, while the other display element is displaying a different type of information.

A power status of the smoking substitute device may in particular be an on/off status of the smoking substitute device, in other words an indication to a user whether the device is switched on or off. Further, e.g. in case the power status is displaying an ON status of the smoking substitute device, a further differentiation of the displayed information may be provided by distinguishing between a status, where the device is on but currently not operable and a further information displaying that the device is on and in a condition that would allow start of operation of the device. In some embodiments the ON status may be indicative of the heating element being energized such that the ON status would indicate that the heating element is active. The ON status may be indicative of the heating element being within the target temperature range, or outside the target temperature range. In such arrangements it is envisaged that the ON status would thus indicate to a user that the heating element is active, or that a "smoking" cycle of the device is in progress. It is also envisaged that in some embodiments, the ON status may be indicative of the heater exceeding a threshold safety temperature which may be, for example, a temperature above 400° C. or which could give rise to a risk of damage to the device.

Accordingly, the second display element may depict second information, which second information conveys different information from the information of the first display element to a user of the smoking substitute device. Such information may be the aforementioned "ready for use" information or may be further information, like a power source level information, a heating status information.

Providing a smoking substitute device with independent display elements, one of which for displaying a power status or ON status of the smoking substitute device facilitates the recognition of an ON status to the user as the display element is not shared so as to display different information at different times. Further, separate display elements allow the provision of operation information to a user completely independent of the requirement to also indicate a power status, thereby resulting in less confusion of the user to determine whether a device is switched on or off.

Optional features will be set out now. These are applicable singularly or in any combination within the aspect of the present disclosure.

According to an embodiment of the present disclosure, the power status is for displaying an on/off status of the smoking substitute device. E.g., the display may be illuminated when the smoking substitute device is in an ON status, while it may not be illuminated when the smoking substitute device is an OFF status. Thereby, a user can instantly gather from the display element the power status of the smoking substitute device.

According to a further embodiment of the present disclosure, the other one of the first and second information may be for displaying information out of the group consisting of status information, power source level information, time to use information, remaining time of use information, heating status information.

Accordingly, the information may display how much energy is left in the power source, how much time is required before the smoking substitute device may be in an operable condition, e.g. displaying time until the heating element has reached a target temperature for consumption. Further, a remaining time of use information may indicate a time until the power source is emptied to a point where no operation of the smoking substitute device is possible anymore. Even further, heating status information may provide information whether the heating element is currently switched on or off, thus whether it is heating the tobacco material.

The first display element and the second display element may be differently sized.

According to a further embodiment of the present disclosure the display element not displaying the power status information may be substantially larger that the display element displaying the power status information.

Providing a display which is substantially larger, e.g. twice the size, three times the size, four times the size, five times the size or even larger, provides the opportunity to display more information than on the display displaying the power status information. To that extent, the first display element and the second display element are not required to be of the same technology.

According to a further embodiment of the present disclosure, the display element displaying the power status information may be active substantially as long as the smoking substitute device is in an ON status and the display element not displaying the power status information and may be only intermittently activated. In other words, the power status of the smoking substitute device may be signaled to a user substantially for the duration of the smoking substitute device being in an on powered status while additional information may only be delivered to the user when required.

It is further conceivable that the display element not displaying the power status information may not be continuously activated with different types of information but also may be de-activated or off during a time where no information needs to be conveyed to a user. Contrary hereto, the power status information may be provided to a user for as long as the smoking substitute device is switched on.

According to a further embodiment of the present disclosure, the smoking substitute device further comprises a control element, wherein the display element displaying the power status information is arranged in the vicinity of or is incorporated in the control element.

By so linking the display element displaying the power status information with the means to switch on and off the smoking substitute device, a logical grouping for easier readability is provided to the user.

According to a further embodiment of the present disclosure, the first display element and/or the second display element may be a display element out of the group consisting of an LED element, a plurality of LED elements, an LCD display element, an OLED element and a plurality of OLED elements.

LED elements or organic LED elements may allow the provision of information to a user in a manner to which the user is accustomed while minimising energy consumption for the operation of the display elements. An LCD display element, comprising e.g. a matrix of LED elements or organic LED elements, may allow the display of more complex information to a user.

According to a further embodiment of the present disclosure the first display element and/or the second display element are adapted for displaying information in different colours. As such, the colours of the first display element and the second display element may be different from one another or the display element may be adapted for changing the colour used for displaying information. Likewise, a display element may be a multi-colour display element being able to change its colour, e.g. dependent on the information to be displayed.

According to a further embodiment of the present disclosure, a change in colour of a display element may correspond to a change in a status displayed. E.g. the power status may be displayed by an illuminated display element, while further information may be conveyed by employing different colour, e.g. a red colour for a basic ON indication, while e.g. a green colour may display ON status and further a "ready to use" status of the smoking substitute device.

According to a further embodiment of the present disclosure, a type of displayed information may be colour dependent. E.g. a green coloured countdown displayed on a display element may relate to time until the device is operable to start the substitute smoking operation, while a red coloured countdown may signify a different type of information.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DETAILED DESCRIPTION OF THE FIGURES

FIG. 1A shows a view of an exemplary embodiment of a smoking substitute device 10, here exemplarily an HNB device 10.

The HNB device 10 comprises a rod-shaped heating element 12, which projects into a cavity 14 within the main body 16 of the device 10. A smoking substitute consumable 20 may be inserted into the cavity 14 of the main body 12 of the device 10 such that the heating rod 12 penetrates an aerosol-forming substrate, e.g. tobacco material in one outer part, e.g. the lower part of the smoking substitute consumable 20, distal from an outward facing opening 42 of cavity 14. Heating of e.g. reconstituted tobacco in the aerosol-forming substrate is effected by powering the heating element 12, with a power source 18, e.g. a rechargeable battery 18 incorporated in the smoking substitute device 10. As the tobacco is heated, moisture and volatile compounds (e.g. nicotine) within the tobacco and possibly a humectant are released as a vapour and entrained within an airflow generated by inhalation by the user.

Heating of the tobacco by the heating element 12 may be activated by the user pressing an actuator 26, here exemplarily activation switch 26, on a side surface of the main body 16 of the smoking substitute device 10. Display element 28, here exemplarily a number of LEDs, is arranged in the vicinity of the activation switch 26 on the side surface of main body 16.

At the bottom of smoking substitute device 10, e.g. at a second end 54*b*, a charging connector 30 is arranged. The charging connector 30 may be embodied as a standard USB connector, e.g. mini-USB or micro-USC. In certain particular (but non-limiting) embodiments, the charging connector 30 is embedded as a symmetrical connector, like a USB-C connector. Alternatively, the charging connector 30 may be embodied as a lightning connector. The charging connector 30 may provide a connection for either energy or data or both.

A certain mode of operation may result in different temperatures of the heating element 12 and thus different amounts of heat energy provided to the aerosol-forming substrate. Following, the substrate is heated to different temperatures depending on a certain mode of operation. E.g. in a first mode of operation, the aerosol-forming substrate may be heated to 250° C., while in a second mode of operation, the aerosol-forming substrate may be heated to 350° C. Different heat energies provided to the aerosol-forming substrate may result in a different release behaviour of both nicotine and vapour from the aerosol-forming substrate and thus in a different substitute smoking experience to a user.

In certain embodiments, the smoking substitute device 10 of FIG. 1A comprises a length l, and further has first end 54*a* and a second end 54*b*. The first cavity 14*a* is arranged at the first end 54*a* while a second cavity 14*b* is arranged at the second end 54*b*. The first cavity 14*a* e.g. is a cavity for receiving a smoking substitute consumable 20, which is indicated by the arrow in FIG. 1A. The second cavity 14*b* may correspond to an electrical interface 30 arranged at the second end 54*b*.

In certain embodiments, a bung element 56 is arranged at the first end 54*a* and is in particular situated within the first cavity 14*a*. The surface of the first end 54*a* corresponds to the shape of the bung element 54 so that the bung element 56 is substantially flush with the main body 16 in the area of the first end 54*a*.

The smoking substitute device 10 in FIG. 1A may be in a non-operable mode in that the bung element 56 in inserted into the first cavity 14*a* and thus insertion of a smoking substitute consumable 20 is blocked.

Figure 1B:
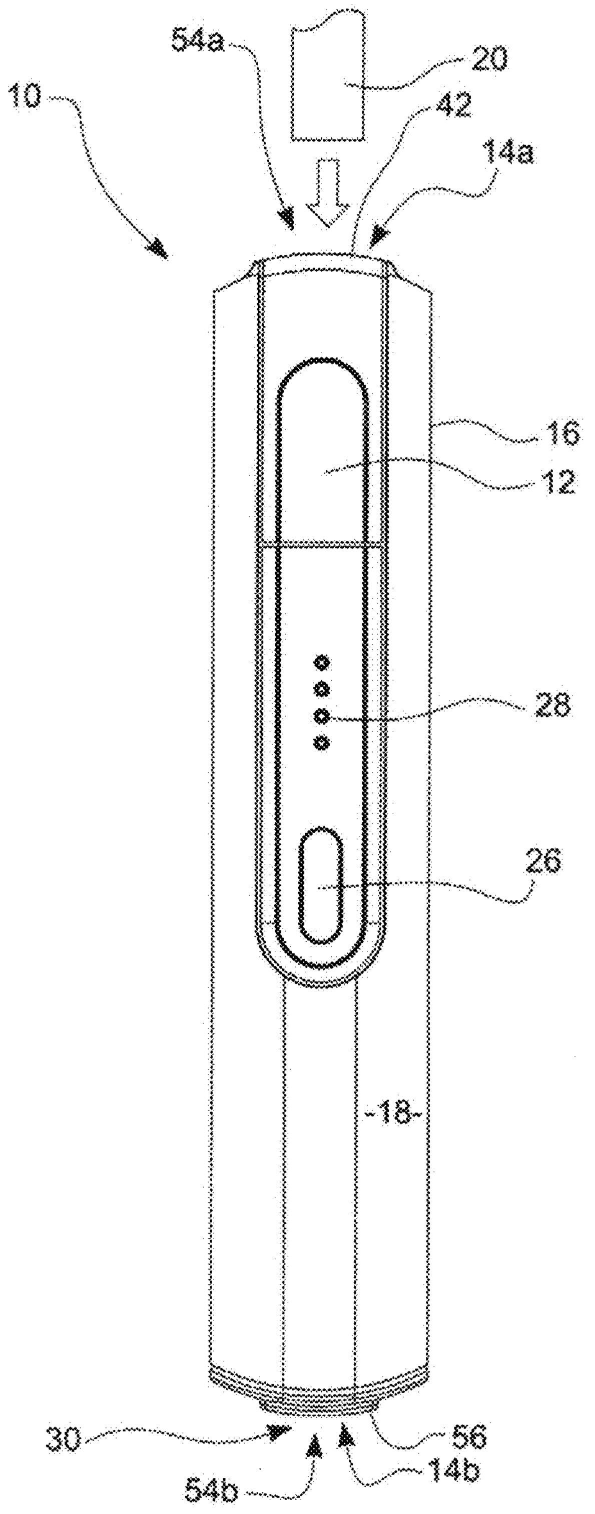

Now referring to FIG. 1B, which depicts a situation where the smoking substitute device 10 may be operated. The main difference between FIG. 1A and FIG. 1B is the bung element 56 being arranged at the second end 54*b* and in particular being inserted into the second cavity 14*b* or the electrical interface 30. In FIG. 1B, a smoking substitute consumable 20 can be received by the first cavity 14*a* due to the absence of the bung element 56. Thus, operation of the smoking substitute device is possible.

Figure 2A:
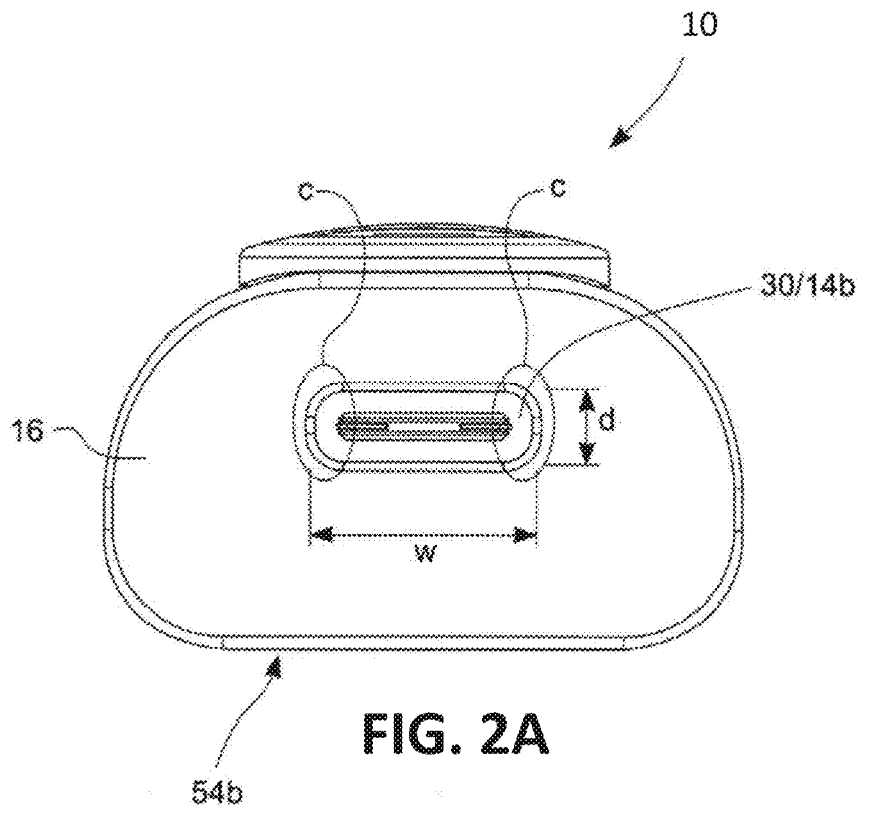
FIGS. 2A, 2B, and 2C show a cross-section of a smoking substitute device in accordance with the present disclosure.
Figure 2B:
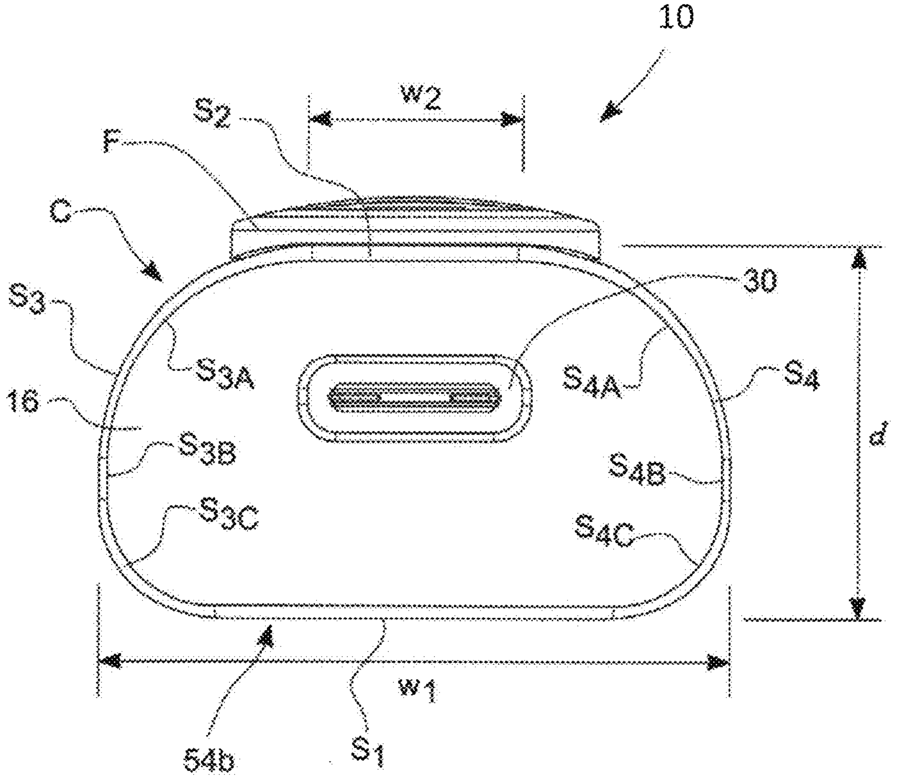

Now referring to FIGS. 2A and 2B, a bottom view of the smoking substitute device is depicted. FIG. 2A shows the bottom view towards the second end 54*b* comprising the second cavity 14*b* which corresponds to the electrical interface 30. Electrical interface 30 is exemplary embodied as USB-C connector. The second cavity 14*b*/the electrical interface 30 has a width w, a depth d, as well as a curvature c of the side flanges in the extension direction of the width w.

FIG. 2B is a cross-sectional view of the transverse cross-section of the smoking substitute device 10. The main body 16 comprises two at least partially parallel, substantially linear sides S1, S2 which are arranged on opposite sides of the cross-section. Side S1 comprises width w1 of the cross-section width w of the smoking substitute device 10/the main body 16. Side S2 comprises width w2 of the cross-section width w. Exemplary, width w1 may be twice the width w2 while the width w may be three times the width w2. The smoking substitute device further comprises a depth d and a length l, as depicted in FIG. 1. The view in FIG. 2B indeed is the view on the cross-section C from the second end 54*b*, since electrical interface 30 is visible, e.g. a symmetrical connector like a USB-C or lightning connector.

The curved sides are depicted as non-circular. Indeed, the curved sides S3, S4 in FIG. 2B each comprise exemplarily three subsections S3A, S3B, S3C and S4A, S4B, S4C. As can be taken from FIG. 2B, subsections S3A, S3C, S4A and S4C are curved subsections, while subsections S3B and S4B are substantially linear subsections in accordance with the definition of substantially linear as used in this disclosure. It is likewise conceivable to extend subsections S3A, S3C, and S4A, S4C, thereby not requiring subsections S3B and S4B. Each of the subsections S3A, S3C, S4A, S4C are not required to correspond to a defined or uniform radius of curvature. However, as may be taken from FIG. 2B, the individual subsections of sides S3 and S4 as well as the two substantially linear sides S1 and S2 are shaped/curved in a way to provide a substantially continuous transition of the overall surface of the smoking substitute device 10, without any bends or edges, thereby improving a holding experience of a user. One of the substantially linear sides S1, S2 in embodied as a front side S2, while the other side is embodied as a back side S1 of the smoking substitute device 10.

An additional front face element F is provided in FIG. 2B, which may substantially be attached to the outer surface, or rather may be incorporated into the outer surface of the smoking substitute device, thereby providing means for variation of a front face element without the necessity to vary the main body of the smoking substitute device 10 itself. The front face element F may comprise a display element, a control element or both. It may further comprise additional elements like a second display element or further control elements.

Figure 2C:
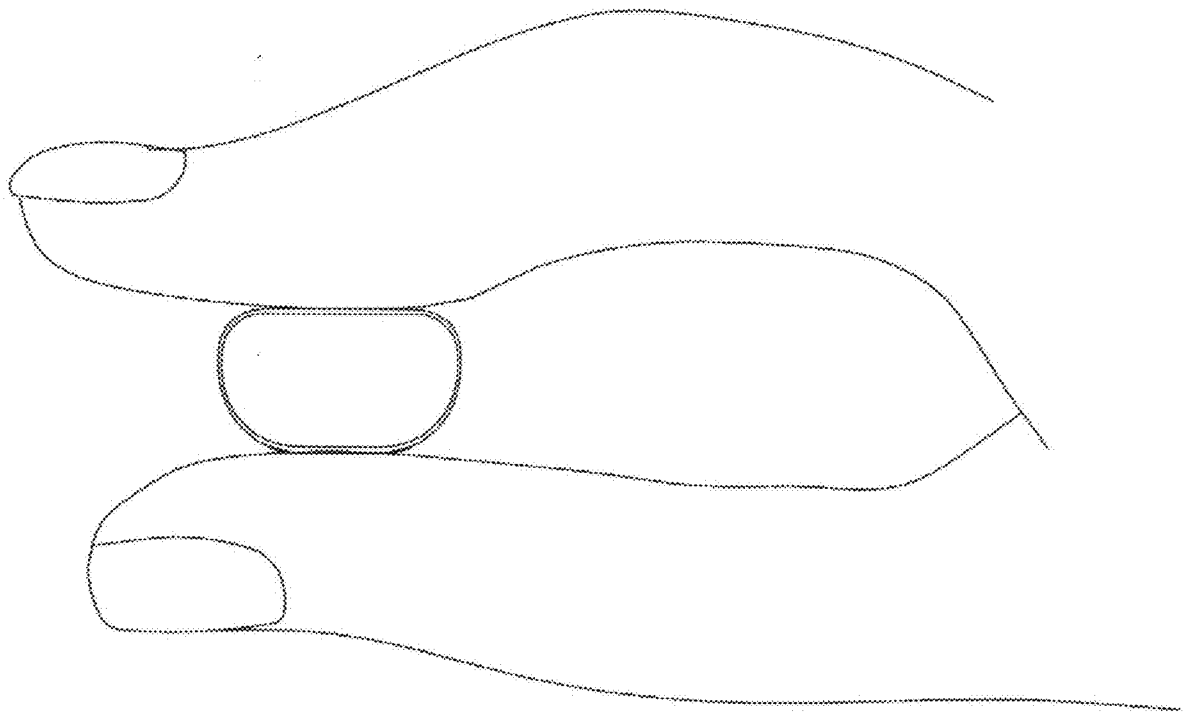

Now referring to FIG. 2C, an exemplary holding position of the smoking substitute device 10 is depicted. As can be taken from FIG. 2C, a user of the smoking substitute device may conveniently hold the smoking substitute device 10 between the fingers with the thumb resting on one of the substantially linear sides, in FIG. 2C exemplary the substantially linear side S1, e.g. the front side, while some or all of the remaining fingers rest against the other one of the substantially linear sides, in FIG. 2C exemplary linear side S2, e.g. the back side. For ease of understanding, the front face element F is not depicted in FIG. 2C. The User may e.g. hold the smoking substitute device 10 in a region below the front face element F.

Not depicted in FIG. 2C but likewise conceivable is a particular (but non-limiting) mode of holding the smoking substitute device with the complete hand of a user with, e.g. one substantially linear side resting against the palm of the user while some or all of the other fingers, possibly except the thumb, are used for holding the smoking substitute device 10 on the opposite of the two substantially linear sides.

Figure 3:
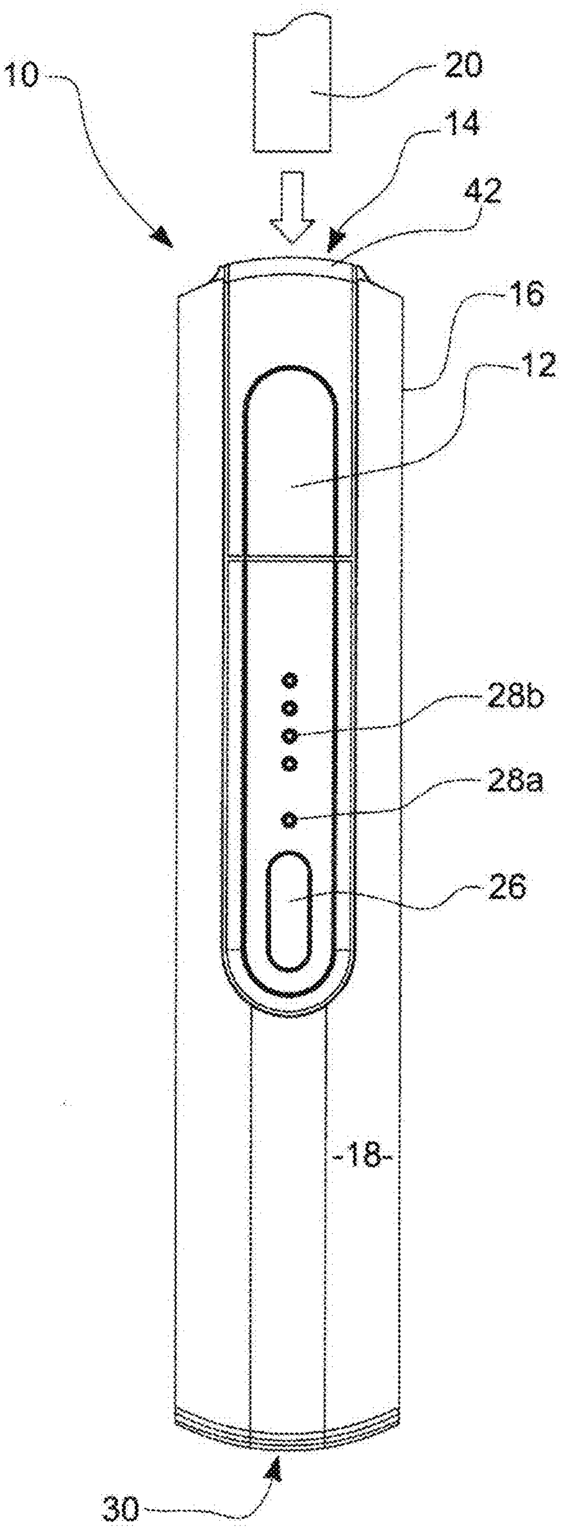
FIG. 3 shows a view of another exemplary embodiment of a smoking substitute device in accordance with the present disclosure.

FIG. 3 depicts another exemplary embodiment of a smoking substitute device 10 that is identical to the smoking substitute device of FIGS. 1A and 1B, except as described herein below (all reference numerals listed on FIG. 3 that are not referenced below are identical to the elements labeled with the same reference numerals described herein above).

The smoking substitute device 10 further includes a first display element 28*a*, here exemplarily a single LED or organic LED, that is arranged in the vicinity of the activation switch 26 on the side surface of main body 16. Further, a second display element 28*b*, here exemplarily a number of LEDs or organic LEDs, is additionally arranged on the main body 16, here exemplarily adjacent to the first display element 28*a*. In other words, the first display element 28*a* is arranged separate from and independent of the second display element 8*b*. In particular by a visually recognisable separation on a front side of the main body 16, this separation is achieved. The first display element 28*a* is arranged in the vicinity of control element 26 to allow easy recognition of the on/off status of the smoking substitute device 10.

At the bottom of smoking substitute device 10, a charging connector 30 is depicted. The charging connector 30 may be embodied as a standard USB connector, e.g. mini-USB or micro-USC. In certain particular (but non-limiting) embodiments, the charging connector 30 is embedded as a symmetrical connector, like a USB-C connector. Alternatively, the charging connector 30 may be embodied as a lightning connector. The charging connector 30 may provide a connection for either energy or data or both.

Figure 4A:
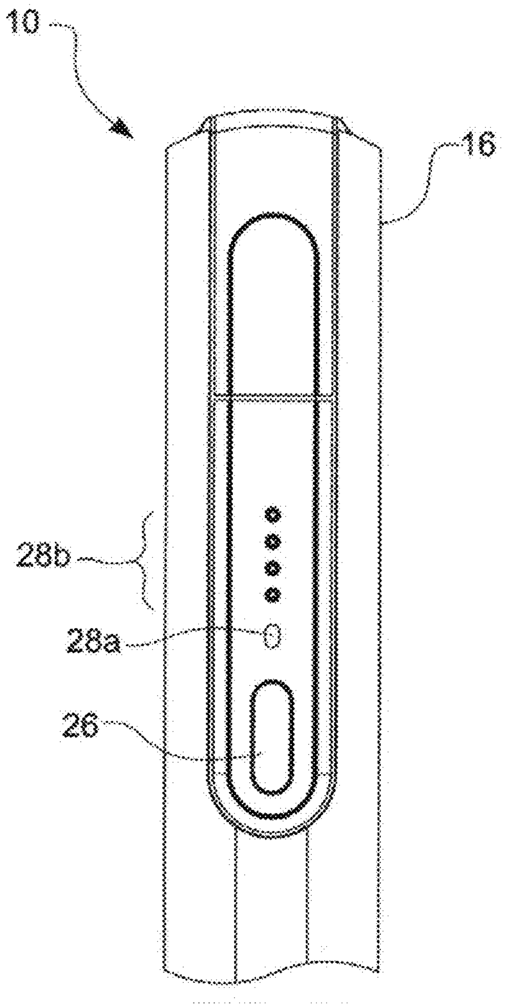
FIGS. 4A and 4B show further exemplary embodiments of a smoking substitute device in accordance with the present disclosure.
Figure 4B:
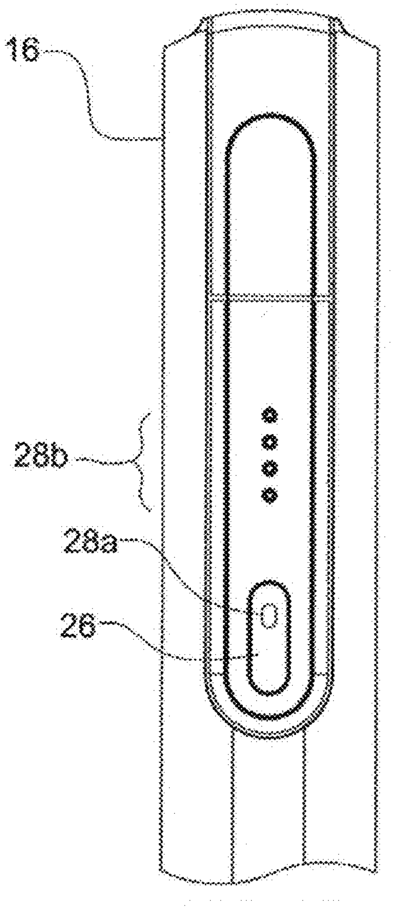

Now referring to FIGS. 4A and 4B, different versions of the first display element 28*a* in accordance with the present disclosure are depicted. In addition to the arrangement of FIG. 3, the first display element 28*a* may be embodied sized differently, in particular sized differently to the second display element 28*b* and its individual elements, respectively, or the location may be changed. E.g. in FIG. 4A, a larger LED element or organic LED element is employed. Possibly, the first display element 28*a* comprises a plurality of coloured, in particular differently coloured, LED elements or organic LED elements, to be able to depict different colours. In FIG. 4B, the first display element 28*a* has been incorporated into control element 26. The first display element 28*a* of FIG. 4B corresponds to the first display element 28*a* of FIG. 4A. It is also conceivable to integrate a first display element 28*a* in accordance with FIG. 3 into control element 26.

Figure 5A:
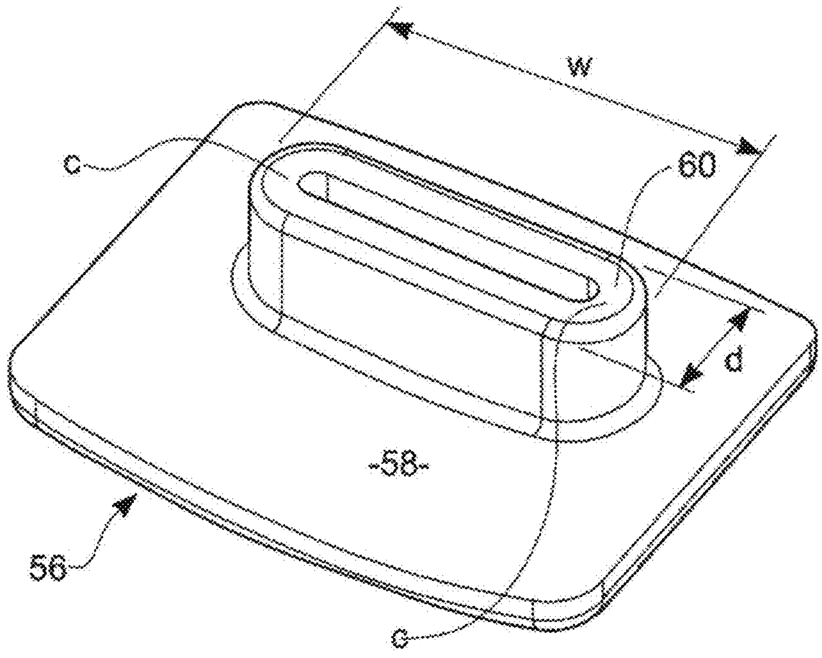
FIGS. 5A and 5B shows different views of an exemplary embodiment of a bung element in accordance with the present disclosure.
Figure 5B:
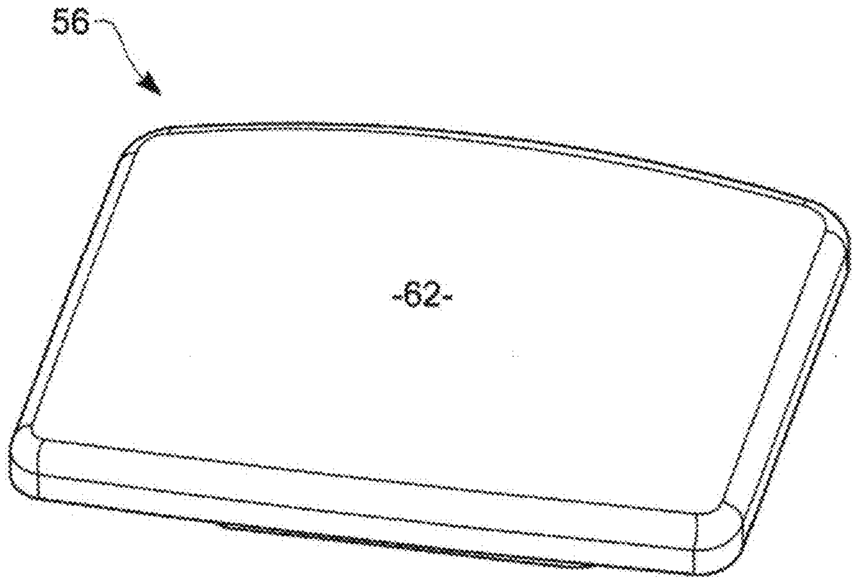

Now referring to FIGS. 5A and 5B, a bung element 56 utilized with the smoking substitute device 10 is depicted. In FIG. 5A, the inner side surface 58 is depicted comprising a protrusion 60. The protrusion 60 has a width w, a depth d as well as a curvature c, all of which correspond to the width, depth and curvature of the second cavity 14*b*, so that the protrusion 60 may be inserted into the second cavity 14*b*. Both the second cavity 14*b* and the protrusion 60 may be sized such that the bung element 60 is kept inserted into the second cavity 14*b* by frictional forces of the protrusion 60 and the second cavity 14*b*, in particular its side walls.

The inner side surface 58 in FIG. 5A comprises a curvature as well, which curvature corresponds to the curvature of the first end 54*a* and the second end 54*b*, so that the bung element is flush against the surface of the smoking substitute device when in inserted into one of the respective first and second cavities 14*a,b*.

Not depicted in the Figures are notches of the first cavity 14*a*, which corresponds in width w and curvature c to the width and curvature of the protrusion, therefore also allowing the insertion of the bung element in a defined position into the first cavity 14*a*. Likewise it is conceivable that the width of the circular shaped first cavity 14*a* corresponds to the width w, so that the no notches are required. With or without notches in the first cavity 14*a*, the bung element 56 may stay in the first cavity 14*a* by frictional forces in the area of the curvature c. FIG. 5B depicts the outer side surface 62 of bung element 56.

Figure 6:
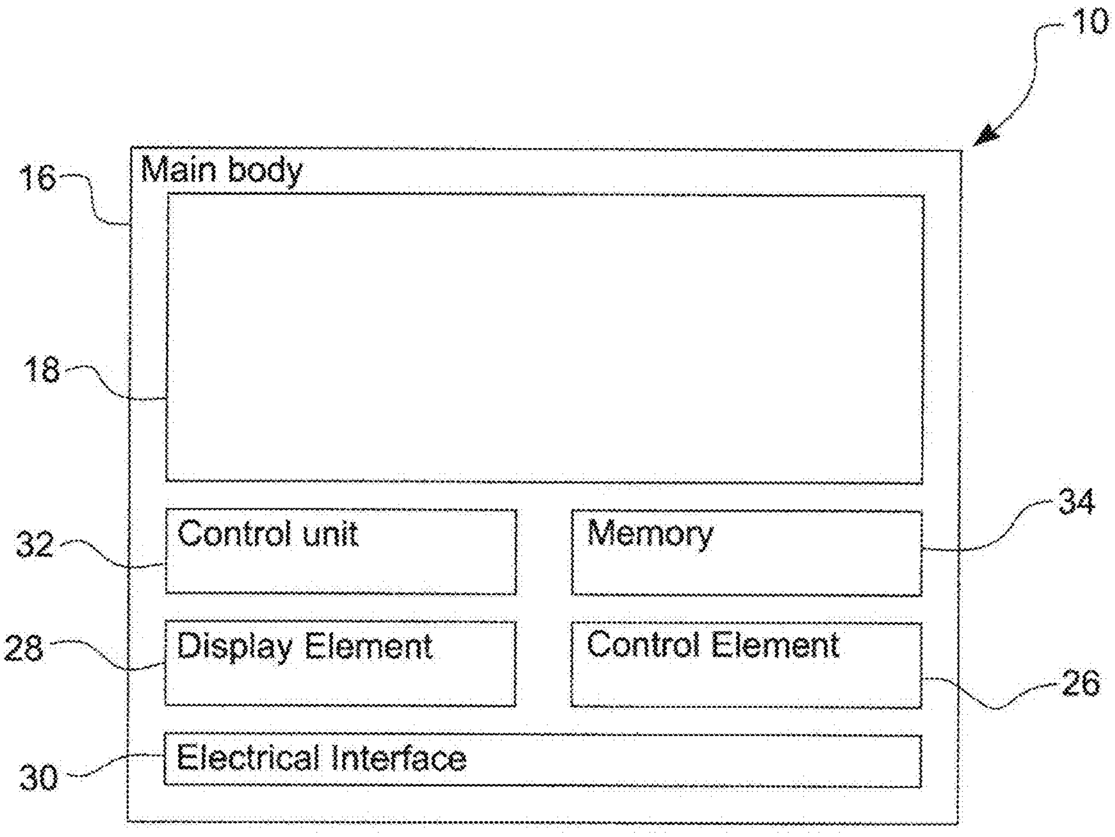
FIG. 6 shows a schematic of an exemplary embodiment of a smoking substitute device in accordance with the present disclosure.

Now referring to FIG. 6, a schematic of an exemplary embodiment of a smoking substitute device in accordance with the present disclosure is shown.

Smoking substitute device 10 comprises a main body 16 or housing and a power source 18, e.g. a rechargeable battery. Further provided is a control unit 32, which may include a microprocessor. Memory 34 is provided for storing e.g. control instructions for control unit 32 or the microprocessor. Memory 34 is provided in certain particular (but non-limiting) embodiments as non-volatile memory. Smoking substitute device 10 may further comprise a display element 28, which may be embodied as a single or a plurality of LEDs or organic LEDs. The LEDs are possibly adapted for displaying different colours in accordance with instructions from the control unit 32 and memory 34, depicting different modes of operation with different colours of smoking substitute device 10 or generally different information directed to the user operating the smoking substitute device 10. A control element 26 is provided, e.g. an actuator or activation switch, with which the smoking substitute device may be switched on and off, an operation may be initiated and/or a mode of operation may be set.

Further, an electrical interface 30 or charging connector 30 is provided, which may be incorporated in the main body 16 and which may include one or more electrical contacts. The electrical interface 30 may be located in, and in certain non-limiting embodiments at the bottom of, an aperture in an end section of the main body 16. Electrical interface 30 may be adapted to be coupled with an external charging station to receive power for charging the power source 18. Alternatively, electrical interface 30 may be embodied as a charging connector 30, which may be a USB or lightning connection. In certain particular (but non-limiting) embodiments, the charging connector 30 is embodied as a USB-C connector, which is an example of a symmetrical connector.

In short and using a different terminology, it is proposed to provide a heat-not-burn device for smoking a consumable. A heating element heats the tobacco material in the consumable to a desired temperature, thereby releasing an aerosol containing nicotine for inhalation by a user. The HNB device is arranged to control the temperature of the heating element in a way to be able to provide different temperatures to the tobacco material in the consumable, thereby changing the release properties of the components in the consumable, e.g. nicotine. Different temperatures provide a changed release behaviour of the tobacco material thereby providing a different smoking experience to a user.

Also, it is proposed to provide a heat not burn smoking substitute device for smoking a smoking substitute consumable with a plug to alternatively close one of two openings within the housing of the smoking substitute device. The plug may be either inserted into an opening for receiving a smoking substitute consumable or in a charging connector. At least a part of the plug is shaped such that the plug maintains its position by frictional forces by force fit or form fit when inserted into the respective opening. An opening may be substantially completely closed by the plug thereby avoiding or preventing entry of debris.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the inventive concepts in diverse forms thereof.

While the present disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to non-limiting embodiments of the present disclosure that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

Elements that are described in conjunction with different embodiments may be combined. Reference signs in the claims shall not to be construed as limiting the scope of the claims.

LIST OF REFERENCE NUMERALS

10 smoking substitute device/HNB device
12 heating element
14 cavity (14*a*—first cavity, 14*b*—second cavity)
16 main body
18 power source/battery
20 smoking substitute consumable
26 control element/actuator/activation switch
28 display element (28*a*—first display element, 28*b*—second display element)
30 electrical interface/charging connector
32 control unit/microprocessor
34 memory
42 outward facing opening of cavity
52*a,b* first, second information
54*a,b* first, second end section
56 bung element
58 inner side surface
60 protrusion
62 outer side surface
c curvature
d depth
w width
l length
C cross-section
w1,w2 first, second width
S1,2,3,4 first, second, third, fourth side
F Front face element

We claim:

1. A smoking substitute device, comprising:
a main body; and
a control element;
wherein the main body comprises a first display element for displaying first information and a second display element for displaying second information;
wherein the first display element is arranged separate from and independent of the second display element;
wherein the first information is different from the second information;
wherein one of the first and second display elements is for displaying a power status of the smoking substitute device;
wherein the smoking substitute device is a heat-not-burn device;

wherein the control element is for switching the smoking substitute device on or off; and wherein the display element for displaying the power status is incorporated in the control element.

2. The smoking substitute device according to claim 1, wherein the power status is for displaying an ON/OFF status of the smoking substitute device.

3. The smoking substitute device according to claim 2, comprising a heating element, wherein the ON status is indicative of the heating element being energized.

4. The smoking substitute device-according to claim 1, comprising a heating element, wherein an ON status is indicative of the heating element being within a target temperature range.

5. The smoking substitute device according to claim 1, comprising a heating element, wherein an ON status is indicative of the heating element being outside a target temperature range.

6. The smoking substitute device according to claim 1, comprising a heating element, wherein an ON status is indicative of the heating element exceeding a threshold safety temperature.

7. The smoking substitute device according to claim 1, wherein the other one of the first and second display elements is for displaying information out of the group consisting of status information, power source level information, time to use information, remaining time of use information, heating status information.

8. The smoking substitute device according to claim 1, wherein the first display element and the second display element are differently sized, optionally wherein the display element not displaying the power status information is substantially larger than the display element displaying the power status information.

9. The smoking substitute device according to claim 1, wherein the display element displaying the power status information is active substantially as long as the smoking substitute device is in an on status, and wherein the display element not displaying the power status information is only intermittently activated.

10. The smoking substitute device according to claim 1, wherein the first display element and/or the second display element are a display element out of the group consisting of an LED element, a plurality of LED elements, an LCD display element, an OLED element and a plurality of OLED elements.

11. The smoking substitute device according to claim 1, wherein the first display element and/or the second display element are adapted for displaying information in different colours, optionally wherein a change in colour of a display element corresponds to a change in a status displayed.

12. The smoking substitute device according to claim 11, wherein the type of displayed information is colour-dependent.

13. A smoking substitute system, comprising a smoking substitute device according to claim 1 and a smoking substitute consumable.

14. A method of using a smoking substitute system comprising the smoking substitute cevice of claim 1 and a smoking substitute consumable comprising:

inserting the smoking substitute consumable into the smoking substitute device; and heating the smoking substitute consumable using a heating element in the smoking substitute device.

15. The method according to claim 14, the method further comprising:

inserting the smoking substitute consumable into a cavity within the main body of the smoking substitute device; and penetrating the smoking substitute consumable with the heating element upon insertion of the smoking substitute consumable.

* * * * *